(12) United States Patent
Persson et al.

(10) Patent No.: US 9,326,193 B2
(45) Date of Patent: *Apr. 26, 2016

(54) LOCAL CALL LOCAL SWITCHING AT HANDOVER

(71) Applicant: Telefonaktiebolaget L M Ericsson (publ), Stockholm (SE)

(72) Inventors: Claes-Göran Persson, Mjölby (SE); Dan Antonsson, Vikingstad (SE); Philip Hodges, Melbourne (AU); Paul Schliwa-Bertling, Ljungsbro (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 94 days.

This patent is subject to a terminal disclaimer.

(21) Appl. No.: 14/225,534

(22) Filed: Mar. 26, 2014

(65) Prior Publication Data

US 2014/0235250 A1 Aug. 21, 2014

Related U.S. Application Data

(63) Continuation of application No. 13/497,930, filed as application No. PCT/SE2012/050218 on Feb. 27, 2012, now Pat. No. 8,712,419.

(60) Provisional application No. 61/449,205, filed on Mar. 4, 2011.

(51) Int. Cl.
*H04W 36/00* (2009.01)
*H04W 36/10* (2009.01)

(52) U.S. Cl.
CPC ...... *H04W 36/0016* (2013.01); *H04W 36/0011* (2013.01); *H04W 36/10* (2013.01)

(58) Field of Classification Search
CPC ............ H04W 36/0016; H04W 36/0011; H04W 36/10
USPC .............. 455/436–444, 445, 426.1, 417
See application file for complete search history.

(56) References Cited

U.S. PATENT DOCUMENTS 5,832,383 A 11/1998 Yahagi
6,212,395 B1 4/2001 Lu et al.
(Continued)

FOREIGN PATENT DOCUMENTS

WO 2011/018524 A1 2/2011

OTHER PUBLICATIONS

International Search Report in corresponding International Application No. PCT/SE2012/050218 mailed Jul. 12, 2012.
(Continued)

*Primary Examiner* — Sharad Rampuria
(74) *Attorney, Agent, or Firm* — Patent Portfolio Builders PLLC

(57) ABSTRACT

Described is a method for managing locally switched call connections in a wireless communication network comprising receiving, at a core network node, a first message indicating that a first user equipment connected via the locally switched call connection has been detected in a target radio access node and transmitting, triggered by the first message, a second message requesting a status change of the locally switched call connection to a second user equipment, such that a user plane data path from the first user equipment to the second user equipment is switched to a core network path. Moreover, the method is implemented in a network node, while the method steps can be executed by means of a computer program product comprising instruction sets performing each method step.

11 Claims, 6 Drawing Sheets

(56) References Cited

U.S. PATENT DOCUMENTS

| | | | |
|---|---|---|---|
| 6,718,169 B1 * | 4/2004 | Martti et al. | 455/424 |
| 8,712,419 B2 * | 4/2014 | Persson | H04W 36/0011 |
| | | | 370/331 |
| 2002/0067707 A1 | 6/2002 | Morales et al. | |
| 2006/0229054 A1 | 10/2006 | Erola et al. | |
| 2008/0310404 A1 | 12/2008 | Valme et al. | |
| 2011/0110295 A1 | 5/2011 | Parolari | |
| 2011/0230193 A1 | 9/2011 | Vikberg et al. | |
| 2012/0129531 A1 | 5/2012 | Tao et al. | |
| 2012/0142338 A1 | 6/2012 | Tao et al. | |
| 2012/0164979 A1 | 6/2012 | Bachmann et al. | |
| 2012/0178453 A1 | 7/2012 | Kampmann et al. | |
| 2012/0270554 A1 | 10/2012 | Hellwig et al. | |

OTHER PUBLICATIONS

Written Opinion of the International Searching Authority in corresponding International Application No. PCT/SE2012/050218 mailed Jul. 12, 2012.

3GPP; "3rd Generation Partnership Project; Technical Specification Group Core Network and Terminals; Handover procedures (Release 11)"; 3 GPP TS 23.009 V11.0.0.; Sep. 2011; pp. 1-296; Valbonne, France.

3GPP; "3rd Generation Partnership Project; Technical Specification Group GSM/EDGE Radio Access Network; Mobile radio interface layer 3 specification; Radio Resource Control (RRC) protocol (Release 11)"; 3GPP TS 44.018 V11.1.0; May 2012; pp. 1-449; Valbonne, France.

3GPP; 3rd Generation Partnership Project; Technical Specification Group Core Network and Terminals; Bearer-Independent circuit-switched core network; Stage 2 (Release 11); 3GPP TS 23.205 V11. 0.0; Sep. 2011; pp. 1-268; Valbonne, France.

3GPP; 3rd Generation Partnership Project; Technical Specification Group GSM/EDGE Radio Access Network; Mobile Switching Centre—Base Station System (MSC-BSS) interface; layer 3 specification (Release 11); 3GPP TS 48.008 V11.2.0; May 2012; pp. 1-224; Valbonne, France.

3GPP; 3rd Generation Partnership Project; Technical Specification Group Core Network and Terminals; Local Call Local Switch; Stage 2 (Release 10); 3GPP TS 23.284 V1.2.0.; Feb. 2011; pp. 1-172; Valbonne, France, XP050486577.

Ericsson: "Additional Control procedure during Inter-BSS Handover"; 3GPP Draft; C4-113039, 3rd Generation Partnership Project (3GPP); vol. CT WG4, Meeting No. 55; Nov. 18, 2011; pp. 1-20; San Francisco, U.S., XP050559568.

Ericsson: "Pseudo-CR on general handover procedure"; 3 GPP Draft; C4-0100293, 3rd Generation Partnership Project (3GPP); 3GPP TSG CT4 Meeting #48; Spec. 3GPP TR 23.889 v 1.1.0; Feb. 22-26, 2010; pp. 1-15; San Francisco, U.S., XP050410813.

* cited by examiner

LOCAL CALL LOCAL SWITCHING AT HANDOVER

TECHNICAL FIELD

The present invention relates generally to telecommunications systems, and in particular, to methods, systems, devices and software associated with local call local switching at handover in radio communication systems.

BACKGROUND

Radiocommunication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telephone System (UMTS) which is an existing third generation (3G) radio communication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

Local Call Local Switch (LCLS) is an ongoing work item within the 3GPP standardization groups GERAN (GSM/EDGE Radio Access Network) and CT (Core Network and Terminals) which is intended to save transmission resources of the Abis and/or A-interface. The LCLS feature provides the capability for the user plane (i.e. the voice data path) to be locally switched within the BSS (e.g. voice data in user plane is not backhauled to the CS Core Network) for calls that are generated and terminated by users that are served by the same BSS. The result is saving of transmission resources on the Abis and/or A-interface. LCLS may be supported on both TDM based A-interface (AoTDM) and IP based A-interface (AoIP). The stage 2 work of the LCLS feature is specified in the 3GPP Technical Specification 23.284 bounded for Release-10 in March 2011.

However, there remain a number of issues regarding how to, for example, handover a user equipment (UE) that has an ongoing call which is locally switched to a target BSS or RNS which does not support the LCLS feature.

ABBREVIATIONS/ACRONYMS

A-interface Interface between the BSC and the MSC\
A-link Interface between the BSC and the MSC
Abis Interface between the BTS and BSC
3GPP 3rd Generation Partnership Project
BSC Base Station Centre
BSS Base Station Subsystem
BTS Base Station System
CN Core Network
CS Circuit Switched Core Network
CT Core Network and Terminals
DL Down Link
GERAN GSM/EDGE Radio Access Network
IE Information Element
Iu Interface between MSC and RNC
LCLS Local Call Local Switch
LTE 3GPP Long Term Evolution
Mc Interface between MSC and MGW
MGW Media Gate-Way
MSC Mobile Switching Centre
MSS Mobile Switching Centre Server
Nc Interface between MSCs
oA A-interface originating call
RAT Radio Access Technology
RNC Radio Network Controller
RNS Radio Network Subsystem
tA A-interface terminating call
TDM Time Division Multiplexing
UE User Equipment
UL Up Link
UMTS Universal Mobile Telecommunications System

SUMMARY

According to an embodiment, a method for managing a locally switched call connections in a wireless communication network comprises: receiving, at a core network node, a first message indicating that a first user equipment which was connected via said locally switched call connection has been detected in a target radio access node which does not support locally switched calls, and transmitting, in response to the first message and by the communication node, a second message requesting a status change of the locally switched call connection to a second user equipment, such that a user plane data path from the first user equipment to the second user equipment is switched to a core network path. Furthermore, the embodiment comprises receiving, at the core network node, a fourth message indicating that the first user equipment has completed the handover and that the call connection between the handed over first user equipment and the second user equipment cannot be locally switched. In response to the fourth message, the method comprises transmitting a fifth message instructing the clearing of the locally switched call connection between the first user equipment and the second user equipment after handover of the first user equipment has been completed. The core network node can, for example, be a mobile switching center (MSC) or it can be a different node, e.g., depending upon the RAT involved. The target network node can, for example, be a base station subsystem (BSS) or it can be a different node, e.g., depending upon the RAT involved.

According to another embodiment, a method for managing locally switched call connections in wireless communication network, comprising receiving, at a core network node, a first message requesting status change of the locally switched connection at the second user equipment and transmitting, in response to the first message, a second message instructing the switching of a user plane data path to a core network path in order to receive user plane data originating from the first user equipment at the second user equipment via the core network path, while user plane data from the second user equipment to the first user equipment is transmitted on the locally switched path and uplink via the core network path. The method according to this embodiment further comprises receiving a fourth message at the core network node, indicating that the locally switched call connection to the first user equipment (102) is no longer locally switched.

According to another embodiment, a method for managing local call connections in a wireless communication network comprises receiving a first message at a network node requesting transmission of uplink user plane data from a second user equipment via a core network path to a first user equipment to be handed over and receiving a second message at the network node requesting switching of user plane downlink data originating from the first user equipment from a local user plane data path to a core network path. In response to the second message, the embodiment further comprises transmitting a fourth message in response to the second message, indicating that the locally switched call connection to the first user equipment is still active. The network node may, for example, be a BSS or it can be a different node, e.g., depending upon the RAT involved.

According to other embodiments, each of the foregoing methods can be implemented in respective communication nodes. The communication nodes can, therefore, include a processor, a communication interface, and/or other suitable structures or elements which are configured to perform the functions recited in the methods.

Moreover, each of the steps in the method embodiments above can be implemented by a suitable computer program product comprising instruction sets for executing the steps in these method embodiments.

Modifications and other embodiments of the disclosed invention(s) will come to mind to one skilled in the art having the benefit of the teachings presented herein. Therefore, it is to be understood that the invention(s) are not to be limited to the specific embodiments disclosed and that modifications and other embodiments are intended to be within the scope of this disclosure. Although specific terms may be employed herein, they are used in a generic and descriptive sense only and not for purposes of limitation.

BRIEF DESCRIPTION OF THE DRAWINGS

The exemplary embodiments described below will be understood, in conjunction with the drawings submitted herewith in which.

DETAILED DESCRIPTION

The following detailed description of the exemplary embodiments refers to the accompanying drawings. The same reference numbers in different drawings identify the same or similar elements. Also, the following detailed description does not limit the invention. The following embodiments are discussed, for simplicity, with regard to exemplary terminology and structure. However, the embodiments to be discussed next are not limited to systems which use such terminology and structure, but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
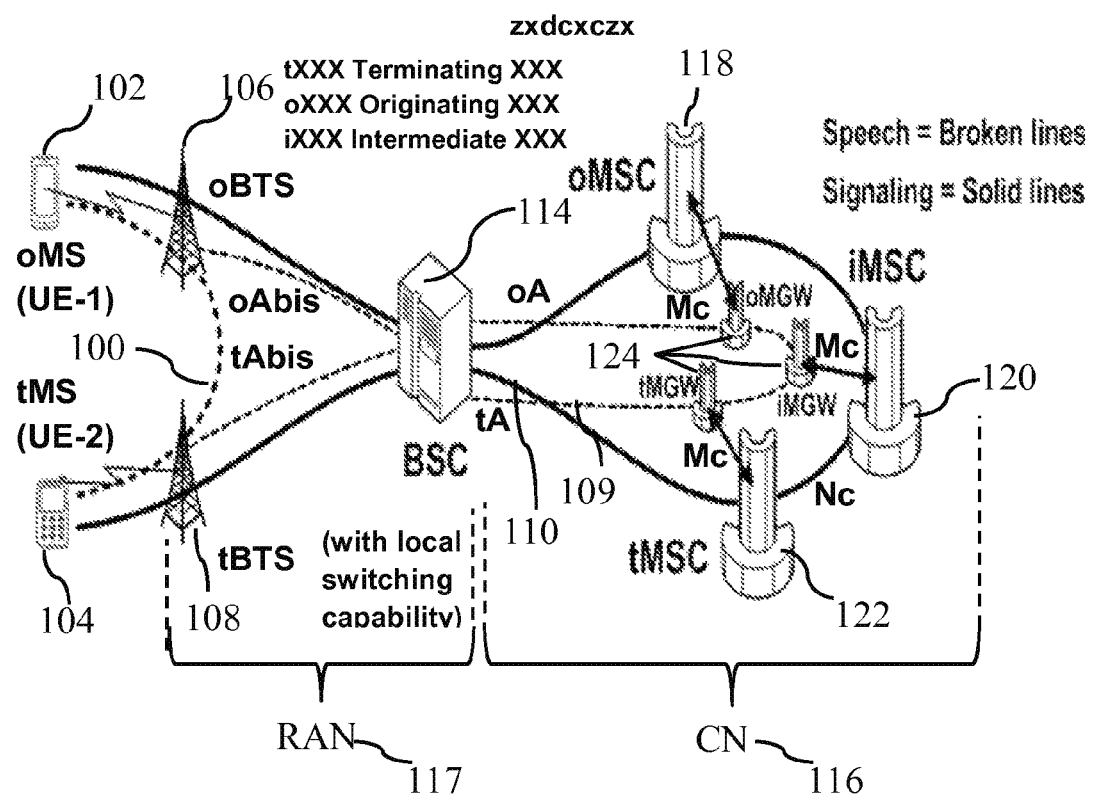
FIG. 1 depicts various nodes associated with a locally switched local call in a radio communication system.

As mentioned briefly above, handover in the context of local call local switched (LCLS) calls presents certain challenges. In order to better understand these challenges, FIG. 1 depicts various nodes and interfaces which are involved in an LCLS call.

The "active" User Plane path 100 is for a call between two UEs 102 and 104 wherein local switching is provided between two BTS's, 106 and 108, while the "inactive" User Plane path 109, i.e. the two Abis-links, the two A-links and the links within the Core Network, are not carrying traffic and are therefore marked with dotted lines. The Control Plane paths 110 are also illustrated in FIG. 1. Moreover, the radio access network part RAN 117 and the core network part CN 116 are illustrated in FIG. 1. As can be seen from FIG. 1, the radio access network RAN 117 in the embodiment in FIG. 1 comprises the BCS/BSS 114 and the two BTS's 106 and 108. In this example, the BSC/BSS 114 has the capability to perform local call switching, however other BSC/BSSs may not have such a capability. Various elements in the core network 116 are also shown including the originating MSC (oMSC) 118, an intermediate MSC (iMSC) 120 and terminating MSC (tMSC) 122 in the signaling/control plane and various MGWs 124 in the data/control plane.

LCLS is typically attempted to be instantiated during the call establishment phase in a radiocommunication system. During this phase, negotiation for support of LCLS is performed within the core network (CN) and requests to correlate and connect the originating and terminating terminals (a.k.a. call legs) are made to the BSS when LCLS is successfully negotiated. Interaction with existing supplementary services, lawful intercept and handover are supported. Depending on the scenario, when such supplementary services are invoked, this may require a break of an existing, locally switched call where the voice data on the user plane is routed via the core network.

When a call is locally switched through the BSS and an inter-system handover occurs to, e.g., an UMTS/LTE RAT, or an inter-BSS handover within the same RAT occurs to a BSS that does not support the LCLS feature, then the locally switched call is broken and normal core network switched user plane is resumed. For example, consider that a mobile station 102 (UE-1) which has an ongoing call that is locally switched in the system of FIG. 1, is handed over to a target BSS (not shown in FIG. 1), or a target RNS, which does not support the LCLS feature. As part of the inter-BSS handover preparation phase and the inter-system handover preparation phase, the anchor MSC sends a message to the BSS 114 (or BSC) controlling the call leg of the stationary mobile station 104 (UE-2, i.e., the mobile station that is not subject to a handover), requesting the BSS 114 to start sending user plane data UL to the core network in addition to the locally switched user plane data sent between UE-1 102 and UE-2 104. In the core network the user plane data from UE-2 104 is transmitted to the target BSS (or, respectively, target RNS), where it eventually will be received by UE-1 102 (when UE-1 102 has moved to the target BSS (respectively target RNS) once the handover is successfully completed).

3GPP Technical Specification 23.284 specifies that the BSS controlling the call leg of the stationary mobile station (UE-2, the mobile station that is not subject to a handover) at the reception of the above message from the MSC also shall be prepared to receive user plane data DL from the Core Network originating from UE-1 when the mobile station eventually has moved to the target BSS (respectively to the target RNS).

This solution implies that this BSS has to autonomously, i.e. without any explicit assistance from the CN, switch the incoming user plane data path between the locally switched connection and the Core Network switched path, when user plane data from the Core Network is detected in the BSS.

This specific solution will unnecessarily increase the complexity of the BSS implementation when LCLS is implemented in a BSS communicating with the core network via a TDM based A-interface. The reason for this is that the TDM time slot pattern for TDM time slots "not in use" and TDM time slots "in use but not containing any user data" on the A-interface are not standardized, hence interoperability between different BSS/MSS vendors will most likely not be ensured.

The 3GPP specification referred to earlier also provides an alternative in case the in-band switch in the BSS based on the detection of the valid user plane, as described above, cannot be implemented in the BSS or will not work due to e.g. interoperability problems. In this case a Clear Command message sent from the anchor MSC (triggered by a Handover Complete message received from the target BSS (or by a Relocation Complete message received from the target RNS on the Iu interface) at the successful completion of the handover procedure) to the old serving BSS of the handed over mobile station (UE-1) will break local switching and resume normal user plane switching through the Core Network from both ends. This means that the BSS controlling the call leg of the stationary mobile station (UE-2, the mobile station which is not subject to a handover) will no longer use the locally switched user plane path as that path has been broken and thus receive the user plane addressed to UE-2 from the CN. However the usage of the Clear Command message in the BSS for the purpose of triggering the switch of the user plane data path towards UE-2 104 will cause a longer break in the speech flow between the two parties compared to the same handover scenario in the legacy network (without any impact of the LCLS feature). More specifically, in a legacy network the change of the target MGW user data path from one-way to both-way is triggered already at the reception of the Handover Detect message (respectively the Relocation Detect message received on the Iu interface) in the target MSC, giving the network the possibility to transmit user data from the handed over mobile station to the other end as soon as the mobile station has completed the handover. The time lag between the Handover Detect message and the Handover Complete message (or between the Relocation Detect message and the Relocation Complete message) has, in live networks, been measured from 200 ms up to 600 ms. This will result in an audible break in the speech flow from UE-1 102 to UE-2 104 if the Handover Complete/Clear Command message (or the Relocation Complete/Clear Command message) is used to trigger the switch of the user plane data path towards the stationary mobile unit during a handover involving LCLS.

Instead, according to embodiments, the core network can assist in switching the user plane path for a call using LCLS which is being handed over. For example, when the mobile station 102 (UE-1) has tuned to the assigned channel in the target cell and the target BSS (or target RNS) has detected the new mobile station, the target BSS (or target RNS) will send the Handover Detect message (respectively Relocation Detect message) to its serving MSC. This Handover Detect message, per se, is a legacy part of the inter-BSS handover and inter-system handover to UMTS procedures, see for example, 3GPP TS 44.018, 3GPP TS 48.008, 3GPP TS 23.205 and 3GPP TS 23.009. However, the reception of the Handover Detect message in the MSC according to embodiments will trigger the sending of a new control message, or an enhanced or modified version of a legacy control message, to the BSS serving the call leg of the other (stationary) mobile station (UE-2). Upon reception of the new control message, or the enhanced or modified version of a legacy control message, the BSS will switch the user plane data path from the locally switched connection to the Core Network switched path. As a result the user plane data is now transmitted from UE-1 102 through the Core Network to the BSS where it is further sent to UE-2 104.

Figure 2:
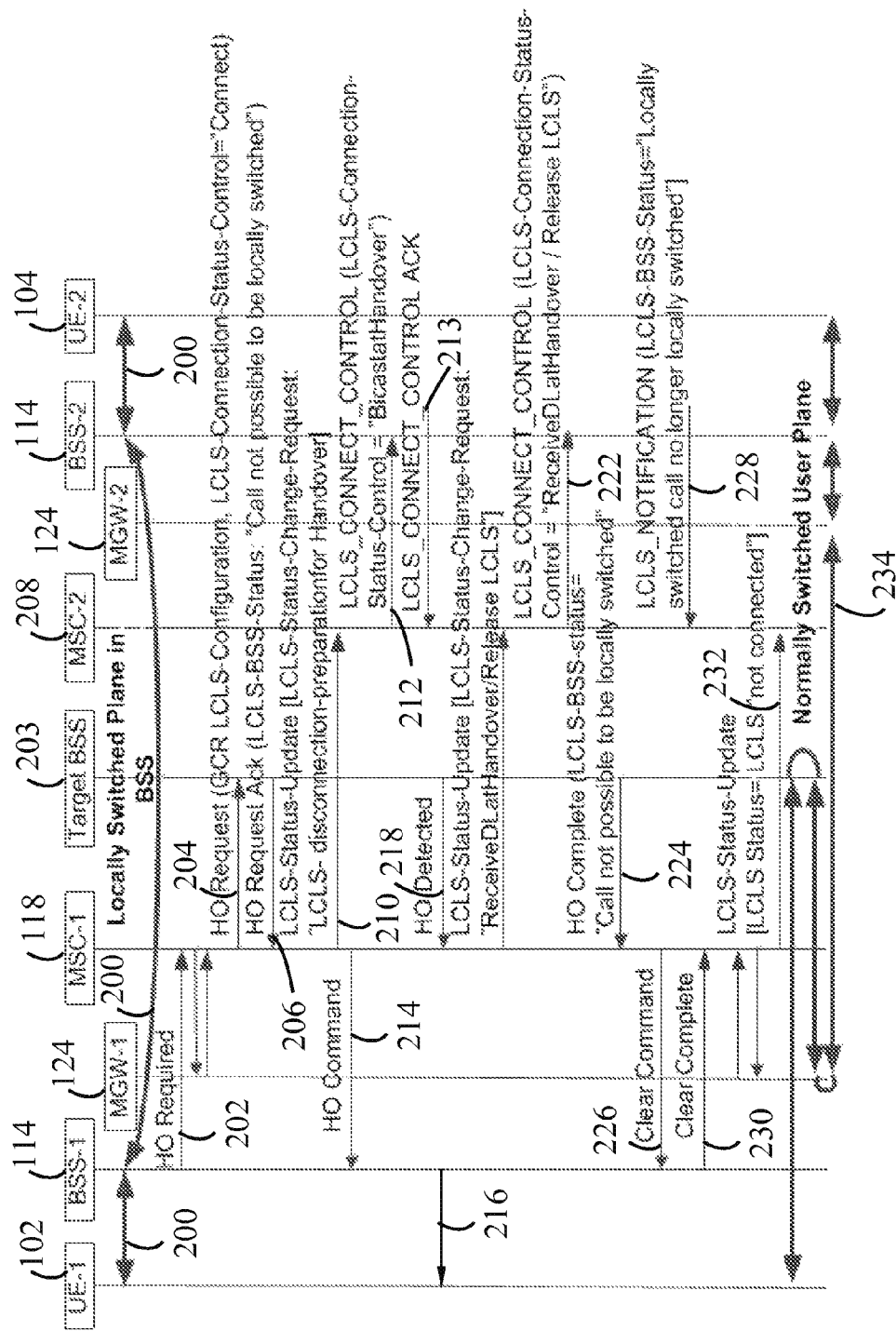
FIG. 2 depicts signaling associated with a handover involving a locally switched local call according to an embodiment.

FIG. 2 shows an exemplary signaling sequence for an embodiment wherein an inter-BSS handover breaks LCLS, and where the call leg belonging to UE-1 is handed over from the serving BSS-1 to the target BSS. Note that in this example, BSS-1 is the same as BSS-2 when LCLS is established for the call, i.e., local call switching is being performed prior to the handover as indicated by arrows 200. At step/signal 202, a Handover Required message is sent from BSS-1 114 requesting an inter-BSS handover for UE-1 102. The Serving BSS-1 114 shall continue to forward the user plane data locally from UE-1 102 to UE-2 104 as long as UE-1 is served by BSS-1.

The Anchor MSC-1 server sends the Handover Request message, as shown in step/signal 204, to the Target BSS 203 with the LCLS-Connection-Status-Control IE indicating "Connect" to through-connect the local call. The Target BSS 203 returns the Handover Request Acknowledge message 206 indicating that the call is not possible to be locally switched since, e.g., Target BSS 203 does not have the LCLS capability.

After receiving a message 210 from the anchor MSC 118 regarding LCLS disconnection, the far end MSC-2 server 208 requests the BSS-2 114 to start sending user plane data UL with the LCLS-Connect-Control message 212 and the LCLS-Connection-Status-Control Information Element (IE) indicating "BicastAtHandover". This triggers BSS-2 114 to bi-cast user plane data from UE-2 UL to the Core Network (MGW-2 124) in addition to the locally switched user plane data sent between UE-1 102 and UE-2 104. In the Core Network the user plane data is transmitted to the Target BSS 203 where it eventually will be received by UE-1 102 (when UE-1 102 has moved to the Target BSS 203). Message 212 is acknowledged via message 213.

The Anchor MSC-1 118 server sends the BSSMAP Handover Command message 214 to the Serving BSS-1 114 which will trigger the BSS to send the Handover Command message 216 to UE-1 102. When UE-1 102 is detected in the Target BSS 203, the Handover Detect message 218 is sent to the Anchor MSC-1 118.

According to embodiments, the Handover Detect message 218 can serve as a trigger for the user plane data path switch in the BSS. For example, upon reception of the Handover Detect message 218, the Anchor MSC-1 server 118 sends an LCLS status change message 220 (e.g. re-using the LCLS-Status-Update message but with a new value in the LCLS-Status-Change-Request IE or using a completely new message) to the succeeding MSC server 208. The far end MSC-2 208 server requests BSS-2 114, via message 222, to switch Down Link (DL) user plane data path on purpose to start receiving user plane data from the Core Network 116 originating from UE-1 102.

According to one embodiment, the message 222 does not explicitly request BSS-2 (and BSS-1) to break local switching, i.e. BSS-1/BSS-2 may continue to send user plane data locally. For this embodiment, the break of local switching is initiated at reception of the Clear Command message in the old serving BSS-1, i.e., signal 226 described below. As an alternative embodiment, MSC-2 server 208 requests BSS-2 114 to break local switching and to start receiving user plane data DL from the Core Network originating from UE-1, i.e. the message 222 will stop BSS-1 and BSS-2 from sending user plane data locally between UE-1 and UE-2. Normal Core Network switched user plane is now resumed at both ends. The message 222 sent from the MSC-2 server 208 to BSS-2 114 could, for example, be a completely new message or a re-use of the existing LCLS-Connect-Control message with a new value in the LCLS-Connection-Status-Control IE In the Handover Complete message 224, the Target-BSS 203 indicates to the MSC-1 server 118 in the LCLS-BSS-Status IE that the call is not possible to be locally switched. The MSC-1 server 118 requests the old serving BSS-1 114 to clear the old call leg via Clear Command message 226. In the 3GPP specification referred to earlier the Clear Command message will also break the local switching, i.e. sending of user plane data locally between UE-1 and UE-2 is now stopped. However, as an alternative (described above) the release of local switching can already be done at the reception of the new control message 222 in BSS-2.

The Serving BSS-2 114 informs the MSC-2 server 208 that LCLS is broken via LCLS-Notification message 228. Clearing of the old call leg in the Serving BSS-1 is completed as indicated by message 230 and the Anchor MSC-1 server 118 informs succeeding Core Network nodes that LCLS is finally disconnected via message 232. At this time, the normally switched user plane is established between UE-1 102 and UE-2 104, as indicated by arrows 234.

Figure 3:
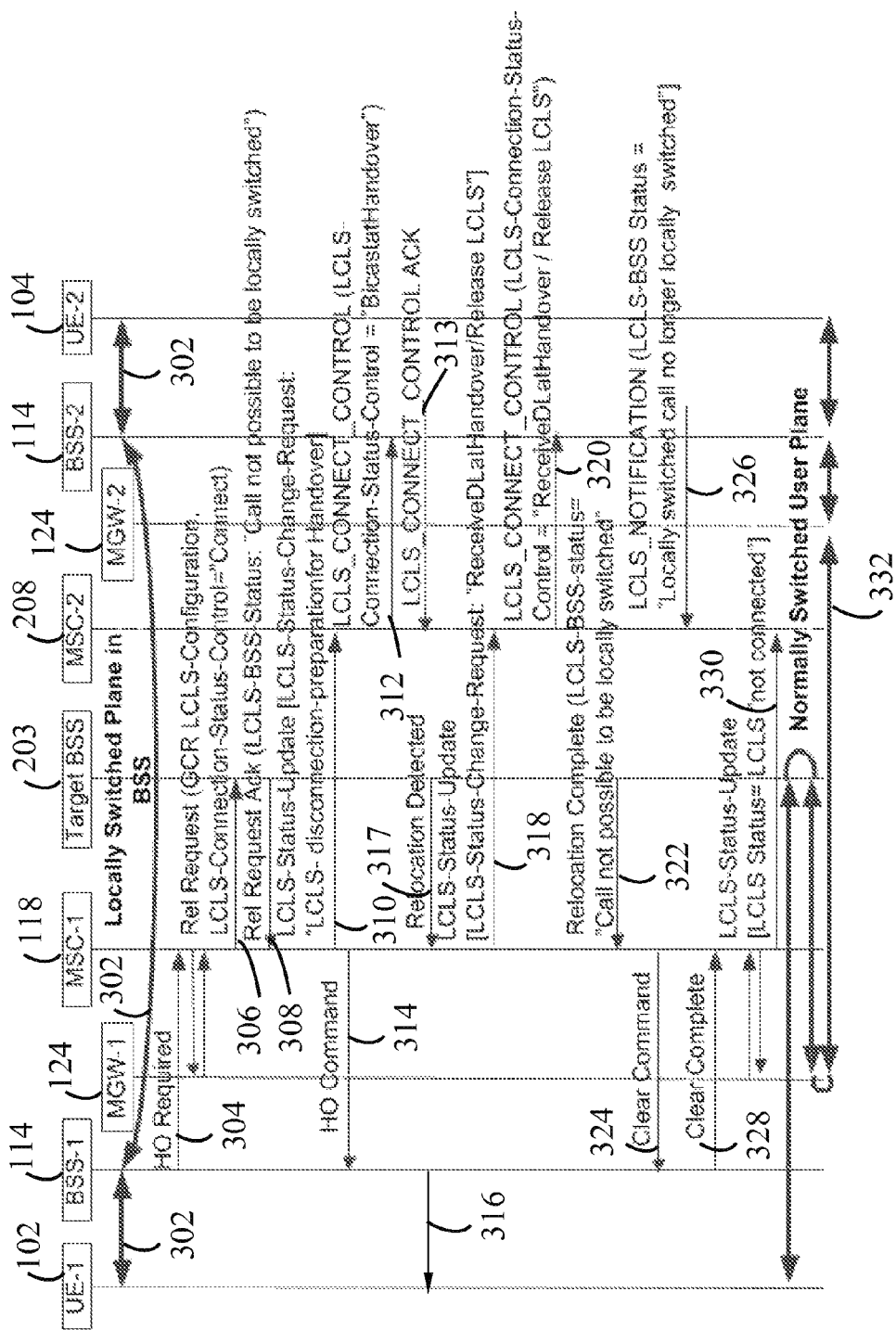
FIG. 3 depicts signaling associated with a handover involving a locally switched local call according to another embodiment.

Similar signaling/steps can be used according to embodiments for performing an inter-system handover which terminates local switching, e.g., to a UMTS RAT, an example of which is provided as FIG. 3. Note that since similar nodes are used in this embodiment relative to that of FIG. 2, the same node numbering is used in FIG. 3 to reference the similar nodes. However, since this figure depicts an inter-system handover to a UMTS RAT, as opposed to an intra-system handover, the target node 300 is labeled as an RNS rather than a BSS in this example. Note further that inter-system handovers according to embodiments are not limited to UMTS RATs, but can be performed between any desired RATs, e.g., toward LTE RATs, etc. Thus the nodes illustrated and discussed below with respect to FIG. 3 as BSSs, MSCs, MGWs and RNSs can more generally be referred to as communication nodes and may be implemented differently in other RATs, e.g., LTE. For example, one or more of the nodes illustrated in FIG. 3 and discussed below can, instead, be an eNodeB or a node in an Evolved Packet Core (EPC), or any other communication node which performs the same or similar functions to those illustrated in FIG. 3.

Again, prior to the handover, UE-1 102 and UE-2 104 are connected via a locally switched call using the same BSS 114 as indicated by arrows 302. Then, a Handover Required message 304 is sent from BSS-1 114 requesting an inter-System handover for UE-1 102. The Serving BSS-1 114 shall continue to forward the user plane data locally from UE-1 102 to UE-2 1-4 as long as UE-1 102 is served by BSS-1 114. The Anchor MSC-1 server 118 sends the Relocation Request message 306 to the Target RNS 300, and the target RNS 300 returns the Relocation Request Acknowledge message 308. Upon being informed of the change in LCLS status via message 310, the far end MSC-2 server 208 requests the BSS-2 114 to start sending user plane data UL with the LCLS-Connect-Control message 312 and the LCLS-Connection-Status-Control IE indicating "BicastAtHandover". Message 312 can be acknowledged by BSS-2 114 via message 313.

Receipt of message 312, triggers BSS-2 114 to bi-cast user plane data from UE-2 UL to the Core Network 116 (e.g., MGW-2 124) in addition to the locally switched user plane data sent between UE-1 102 and UE-2 104. In the Core Network 116 the user plane data is transmitted to the Target RNS 300 where it eventually will be received by UE-1 102 (when UE-1 102 has moved to the Target RNS 300).

The Anchor MSC-1 118 server sends the BSSMAP Handover Command message 314 to the Serving BSS-1 114, which will trigger the BSS 114 to send the Handover Command message 316 to UE-1 102. When UE-1 102 is detected in the Target RNS 300, the Relocation Detect message 317 is sent to the Anchor MSC-1 118. According to this embodiment, the Relocation Detect message 317 is used as a trigger for the user plane data path switch in the BSS 114.

More specifically, upon the reception of the Relocation Detect message 317, the Anchor MSC-1 118 server according to an embodiment sends a LCLS status change message 318 (e.g. re-using the LCLS-Status-Update message but with a new value in the LCLS-Status-Change-Request IE or using a completely new message) to the succeeding MSC server 208. The far end MSC-2 server 208 requests BSS-2 114, via message 320, to switch DL user plane data path on purpose to start receiving user plane data from the Core Network 116 which originates from UE-1 102.

According to an embodiment, the message 320 does not explicitly request BSS-2 114 (and BSS-1 114) to break local switching, i.e. BSS-1/BSS-2 may continue to send user plane data locally. According to this embodiment, the break of local switching is initiated at reception of the Clear Command message in the old serving BSS-1 114, as described below.

As an alternative MSC-2 server 208 requests BSS-2 114 to break local switching and to start receiving user plane data DL from the Core Network 116 originating from UE-1 102, i.e. the message 320 will stop BSS-1 114 and BSS-2 114 from sending user plane data locally between UE-1 102 and UE-2 104. Normal Core Network switched user plane is now resumed at both ends. The message 320 sent from the MSC-2 server 208 to BSS-2 114 could be a completely new message or a re-use of the existing LCLS-Connect-Control message with a new value in the LCLS-Connection-Status-Control IE.

In the Relocation Complete message 322, the Target-RNS 300 indicates to the MSC-1 server 118 in the LCLS-BSS-Status IE that the call is not possible to be locally switched. The MSC-1 server 118 requests the old serving BSS-1 114 to clear the old call leg via the Clear Command message 324. In the 3GPP specification, the Clear Command message will also break the local switching, i.e. sending of user plane data locally between UE-1 and UE-2 is now stopped. However, as an alternative, the release of local switching can already be done at the reception of the new control message 320 in BSS-2, as described above.

The Serving BSS-2 114 informs the MSC-2 server 208 that LCLS is broken via LCLS-Notification message 326. Clearing of the old call leg in the Serving BSS-1 113 is completed, as indicated by message 328. The Anchor MSC-1 server 118 informs succeeding Core Network nodes that LCLS is finally disconnected via message 330 and then data flows via the normally switched user plane 332 after the handover. As mentioned previously, although the embodiment illustrated in FIG. 3 is exemplary of an inter-system handover toward a UMTS RAT, other embodiments can be implemented similarly toward LTE or other RATs and would, therefore, involve different communication nodes as those skilled in the art will appreciate, such as an eNodeBs, etc. Such embodiments are also contemplated by the present invention and, as such, embodiments which refer to one or more "node" or "communication node" are intended to be generic with respect to the particular standardized systems which are involved.

Thus, according to the foregoing embodiments by, for example, using the Handover Detect message as a trigger for switching the DL user plane data path in the serving BSS (or other node) for the stationary mobile station (UE-2) during an inter-system handover or an inter-node handover to a node which does not supporting the LCLS feature, the break in the speech path between the mobile station (UE-1) now located in the target cell and the stationary mobile station (UE-2) will be minimized.

Figure 4:
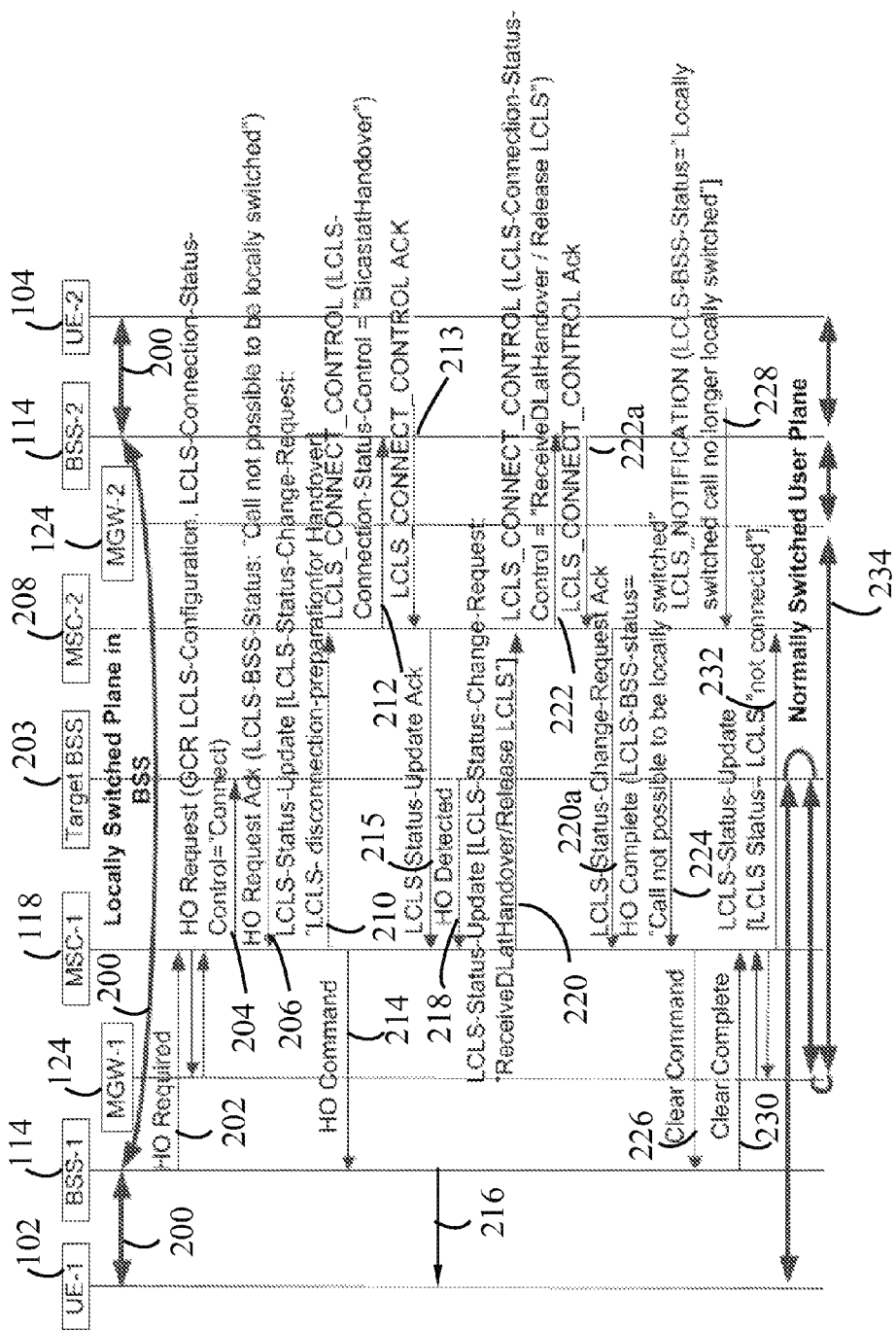
FIG. 4 depicts signaling associated with a handover involving a locally switched local call according to yet another embodiment
Figure 5:
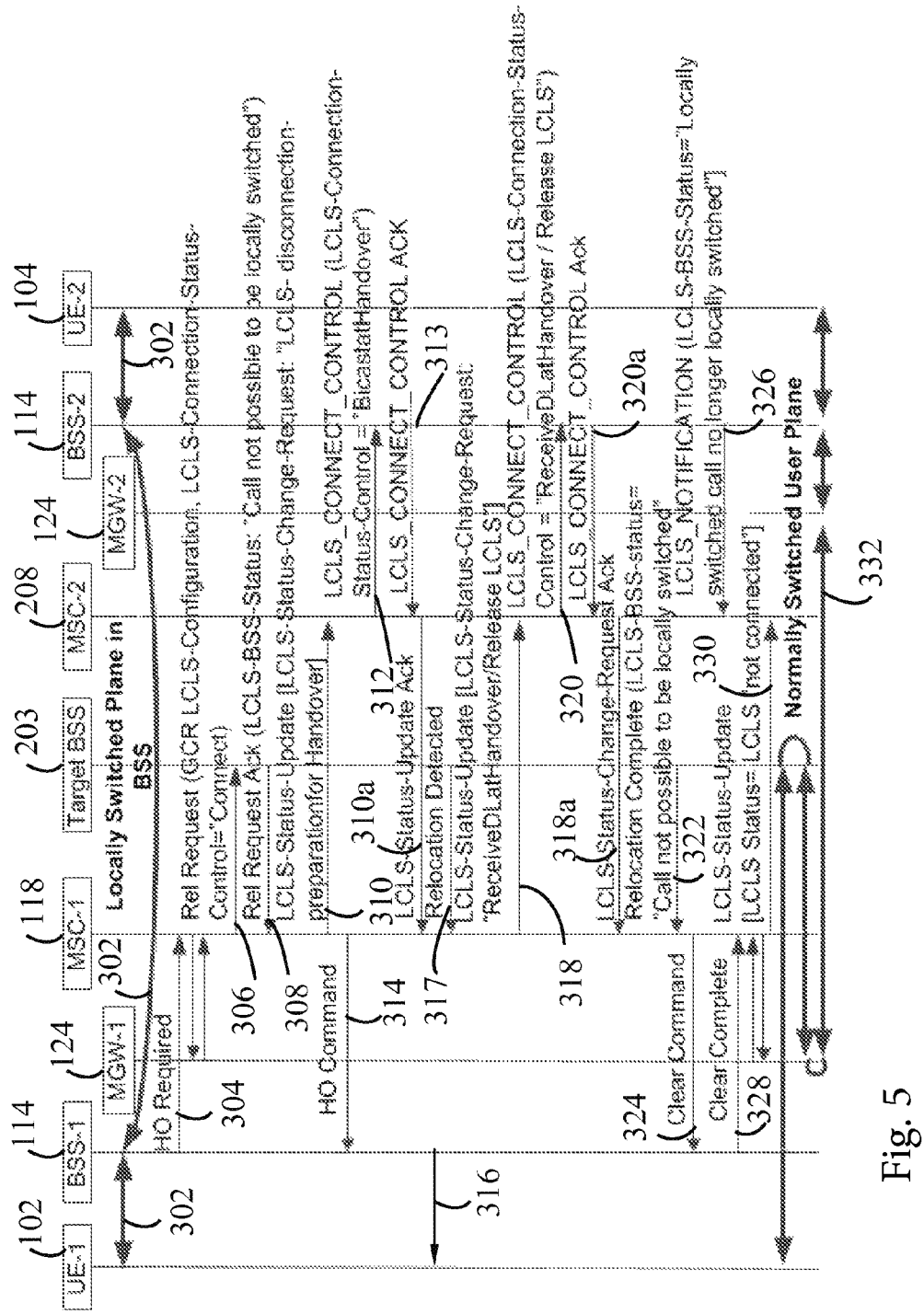
FIG. 5 depicts signaling associated with a handover involving a locally switched local call according to one another embodiment

FIGS. 4 and 5 illustrate other embodiments of the present method where an inter-BSS (FIG. 4) or an inter-RAT (FIG. 5) handover occurs where the LCLS connection is terminated. Both FIGS. 4 and 5 contain some minor modifications to embodiments illustrated in FIGS. 2 and 3. In order to avoid repetition, only the additional signals in these embodiments will be explained, since the remaining signaling in FIGS. 4 and 5 is identical to the embodiments in FIGS. 2 and 3.

In FIG. 4, it is shown that the LCLS-Status-Update message 310 transmitted by the anchor MSC 118 is acknowledged by the far-end MSC-2 server 208 by transmitting the LCLS-Status-Update-Ack message 310a after sending of user plane data UL via both the locally switched call connection and the core network path has begun and been acknowledged by the BSS-2 via the LCSL_CONNECT_CONTROL_Ack message 313.

Moreover, once the user plane path between the first user equipment UE-1 102 and the second user equipment UE-2 104 has been switched to the core network path 109 BSS-2 transmits a LCLS_CONNECT_CONTROL Ack message 222a back to the target MSC-1 208 informing the target MSC-2 208 that the call connection between the first and second user equipments UE-1 102 and UE-2 104 is locally switched with the LCLS configuration requested by the anchor MSC-1 118 in the LCLS-Status-Change-Request message 220. Thereafter, the anchor MSC-1 118 is the informed of the completion of the switching of the user plane path between the first and second user equipments UE-1 102 and UE-2 104 by transmitting an LCLS-Status-Change-Request Ack message 220a from the target MSC-2 208 to the anchor MSC-1 118. This message informs the MSC-1 118 that disconnection of the locally switched call connection between UE-1 102 and UE-2 104 is prepared and that the request for change of the locally switched call connection between the two user equipments UE-1 102 and UE-2 104 has been accepted.

In FIG. 5, the signals LCLS_CONNECT_CONTROL Ack message 320a and an LCLS-Status-Change-Request Ack message 318a are analogous to signals with reference numbers 222a and 220a mentioned in the previous paragraph and will thus not be explained again.

Figure 6:
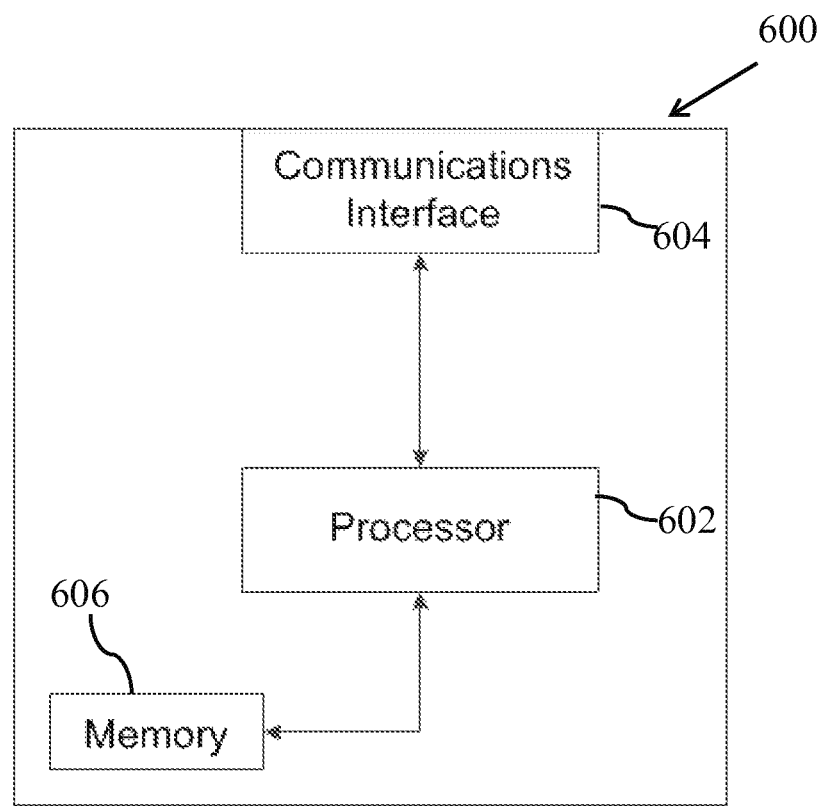
FIG. 6 illustrates a node which can be used to implement embodiments.

The foregoing methods and signaling schemes can be embodied in nodes or structures which are configured to perform the steps described in the above embodiments. An exemplary BSS, eNodeB, MSC or other node 600 described above is generically illustrated in FIG. 6. The node 600 can include a processor 602 connected to one or more communication interfaces 604. The processor 602 is configured to analyze and process signals received from the communications interface(s) 604 and to transmit messages or signals using the communications interface, e.g., as described above with respect to FIGS. 2, 3, 4 and 5. If the node 600 includes air interface capability, e.g., if node 600 is or includes base station functionality, then the node 600 includes one or more antennas (not shown) connected to processor 600 via a transceiver. The processor 600 may also be connected to one or more memory device 606 in which software code or program instructions can be stored for execution by the processor 600 to, for example, generate the messages described above. The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method in a base station subsystem, BSS, for managing local call local switch, LCLS, connections, where a user plane between a first user equipment and a second user equipment being served by the BSS is locally switched, the method comprising the steps of:
when the first user equipment is to be handed over to a target BSS, receiving from a core network node a first LCLS-CONNECT-CONTROL message requesting transmission of uplink user plane data from the second user equipment to the first user equipment via both the locally switched user plane and a core network switched user plane;
receiving from the core network node a second LCLS-CONNECT-CONTROL message indicating that user downlink data originating from the first user equipment is to be received from the core network switched user plane.

2. The method of claim 1, wherein the transmission of uplink user plane data from the second user equipment to the first user equipment is requested by setting an LCLS-Connection-Status-Control information element included in the first LCLS-CONNECT-CONTROL message to Bi-cast UL at Handover.

3. The method of claim 1, wherein the second LCLS-CONNECT-CONTROL message includes an LCLS-Connection-Status-Control information element set to Bi-cast UL and receive DL data at Handover to indicate that user downlink data originating from the first user equipment is to be received from the core network switched user plane.

4. The method of claim 1, further comprising the steps of:
transmitting a first LCLS-CONNECT-CONTROL-ACK message in response to the received first LCLS-CONNECT-CONTROL message; and transmitting uplink user plane data via both the locally switched user plane and a core network switched user plane.

5. The method of claim 1, further comprising the steps of:
transmitting a second LCLS-CONNECT-CONTROL-ACK message in response to the received second LCLS-CONNECT-CONTROL message; and
receiving user downlink data originating from the first user equipment from the core network switched user plane.

6. The method of claim 1, wherein the second LCLS-CONNECT-CONTROL message is received when the first user equipment is detected by the target BSS.

7. A method in a base station subsystem, BSS, for managing local call local switch, LCLS, connections, where a user plane between a first user equipment and a second user equipment being served by the BSS is locally switched, the method comprising the steps of:
when the first user equipment is to be handed over to a target BSS, receiving from a core network node a first LCLS-CONNECT-CONTROL message requesting bicasting of uplink user plane data from the second user equipment to the first user equipment via both the locally switched user plane and a core network switched user plane;
receiving from the core network node a second LCLS-CONNECT-CONTROL message indicating that user downlink data originating from the first user equipment is to be received from the core network switched user plane.

8. A base station subsystem, BSS, adapted for managing local call local switch, LCLS, connections, where a user plane between a first user equipment and a second user equipment being served by the BSS is locally switched, the BSS comprising:
a communication interface adapted for receiving and transmitting data and control information;
a processor configured to analyze and process signals received from the communication interface, the signals comprising a first LCLS-CONNECT-CONTROL message requesting transmission of uplink user plane data from the second user equipment to the first user equipment via both the locally switched user plane and a core network switched user plane when the first user equipment is to be handed over to a target BSS and a second LCLS-CONNECT-CONTROL message indicating that user downlink data originating from the first user equipment is to be received from the core network switched user plane.

9. The BSS of claim 8, wherein the processor further is configured to generate a first LCLS-CONNECT-CONTROL-ACK message in response to the received first LCLS-CONNECT-CONTROL message and to transmit via the communication interface the first LCLS-CONNECT-CONTROL-ACK message to a core network node.

10. The BSS of claim 9, wherein the processor further is configured to generate a second LCLS-CONNECT-CONTROL-ACK message in response to the received second LCLS-CONNECT-CONTROL message and to transmit via the communication interface the second LCLS-CONNECT-CONTROL-ACK message to the core network node.

11. A base station subsystem, BSS, adapted for managing local call local switch, LCLS, connections, where a user plane between a first user equipment and a second user equipment being served by the BSS is locally switched, the BSS comprising:
a communication interface adapted for receiving and transmitting data and control information;
a processor configured to analyze and process signals received from the communication interface, the signals comprising a first LCLS-CONNECT-CONTROL message requesting bicasting of uplink user plane data from the second user equipment to the first user equipment via both the locally switched user plane and a core network switched user plane when the first user equipment is to be handed over to a target BSS and a second LCLS-CONNECT-CONTROL message indicating that user downlink data originating from the first user equipment is to be received from the core network switched user plane.

\* \* \* \* \*